(12) United States Patent
Barbieri

(10) Patent No.: US 6,942,409 B2
(45) Date of Patent: Sep. 13, 2005

(54) BICYCLE CHAIN CLEANER FITTED ON A SPRAY CAN OF CLEANING AND LUBRICATING SOLUTION

(75) Inventor: Adriano Barbieri, Bologna (IT)

(73) Assignee: Barbieri S.N.C. di Barbieri Nadia & Kalman, Argelato (IT)

( * ) Notice: Subject to any disclaimer, the term of this patent is extended or adjusted under 35 U.S.C. 154(b) by 0 days.

(21) Appl. No.: 10/896,940

(22) Filed: Jul. 23, 2004

(65) Prior Publication Data
US 2005/0031399 A1    Feb. 10, 2005

(30) Foreign Application Priority Data
Aug. 6, 2003    (IT)    ............... BO2003A0483

(51) Int. Cl.[7] .................... A46B 11/00; A46B 15/00
(52) U.S. Cl. ................... 401/10; 401/9; 401/190; 184/15.1; 184/15.2; 184/17
(58) Field of Search .............. 401/9–11, 190, 401/285, 288; 184/15.1–15.3, 16, 17

(56) References Cited

U.S. PATENT DOCUMENTS

| | | | |
|---|---|---|---|
| 4,578,120 A | * | 3/1986 | Chiarella ............... 184/15.1 |
| 4,783,186 A | * | 11/1988 | Manning et al. ............ 401/190 |
| 5,020,637 A | * | 6/1991 | Hoenselaar et al. .......... 401/10 |
| 5,213,180 A | * | 5/1993 | Masonek et al. .......... 184/15.2 |
| 5,484,038 A |   | 1/1996 | Rowell |

FOREIGN PATENT DOCUMENTS

| | | |
|---|---|---|
| DE | 298 00 307 U1 | 5/1998 |
| GB | 2 308 419 A | 6/1997 |

* cited by examiner

Primary Examiner—Tuan Nguyen
(74) Attorney, Agent, or Firm—Guido Modiano; Albert Josif; Daniel O'Byrne

(57) ABSTRACT

A bicycle chain cleaner fitted on a spray can of cleaning and lubricating solution, comprising: a lower half-shell and an upper half-shell, which are provided centrally with a flat and elongated tray, respectively for collection and for covering the region where a sprayed solution is dispensed, the half-shells being provided with an inlet and an outlet for the chain, which are aligned and co-planar; articulation elements, which are interposed between the half-shells; elements for coupling to the top of the spray can one of the half-shells; and a sort of trigger, which is associated with the other one of the half-shells in order to make the edges of the half-shells mate, respective brushes with tufts of radial bristles being fitted in the half-shells so that they can rotate, the tufts being adapted to penetrate, when the chain advances in the half-shells, between links of the chain.

10 Claims, 3 Drawing Sheets

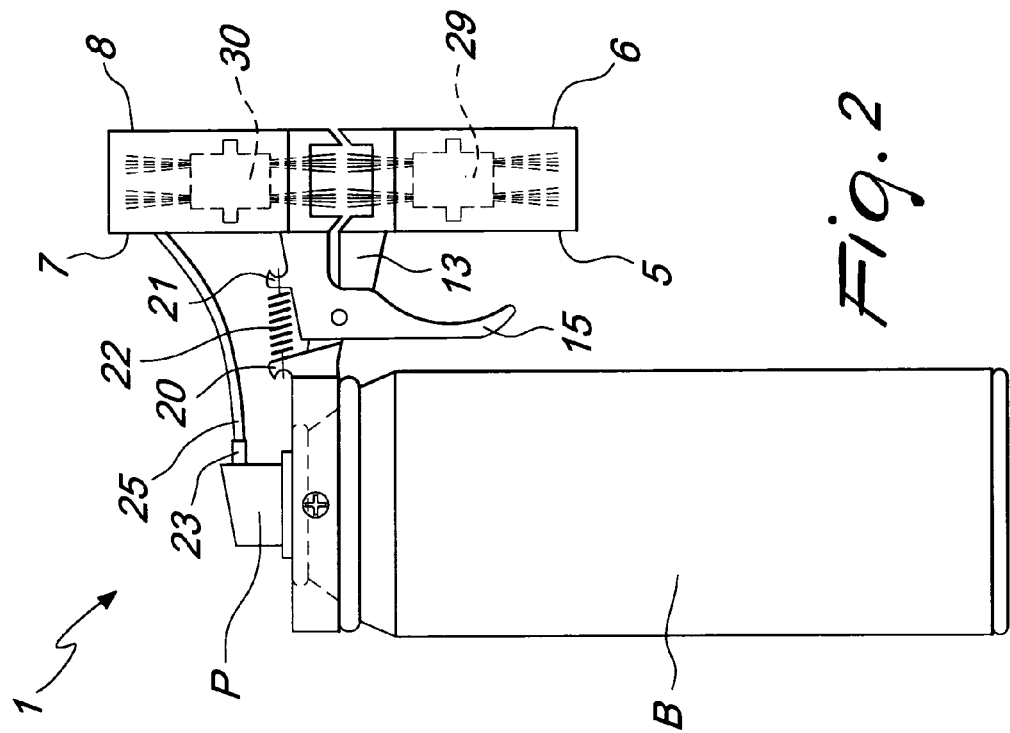
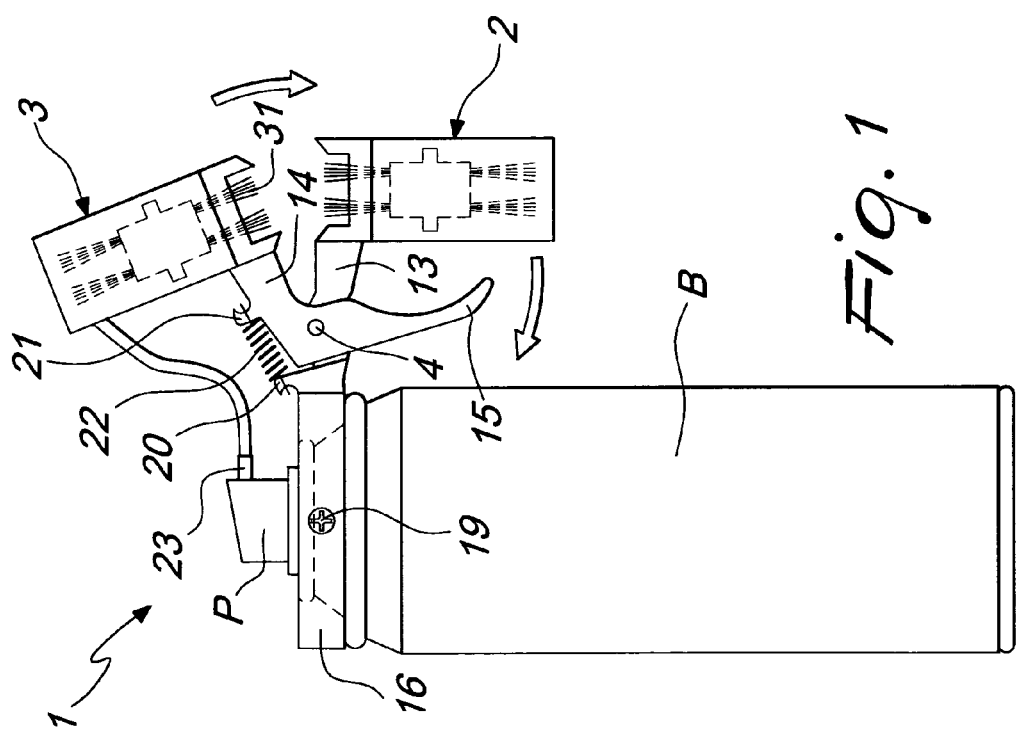

BICYCLE CHAIN CLEANER FITTED ON A SPRAY CAN OF CLEANING AND LUBRICATING SOLUTION

The present invention relates to a bicycle chain cleaner fitted on a spray can of cleaning and lubricating solution.

BACKGROUND OF THE INVENTION

It is known that for optimum efficiency, bicycle chains must be cleaned and lubricated frequently and accurately: usually, cleaning is performed by means of solvents and lubrication is performed by means of lubricants which, depending on the situations, may be of different kinds. Liquids are also known which are used for cleaning and lubrication and are sold in packages of spray cans with forced spray emission by means of the action of propellant gas.

The use of these spray cans has turned out to be particularly effective by way of the action, which includes a mechanical action, of the spray of liquid against the chain, but it has been found that the liquid is not distributed correctly in all the sections of the chain.

In practice, known solvent-lubricant dispensing spray cans lack a valid action for distributing the liquid that can be likened to the action that can be performed with a paintbrush or brush, the bristles of which could be forced between the links of the chain.

In this particular field, moreover, it is known that it must be possible for a single person to perform cleaning and lubrication very rapidly and without dirtying the place where the process is performed.

SUMMARY OF THE INVENTION

The aim of the present invention is to obviate the cited drawbacks and meet the mentioned requirements, by providing a bicycle chain cleaner fitted on a spray can of cleaning and lubricating solution that distributes the liquid correctly in the links of the chain and can be used by a single person, with a single hand and without dirtying the ground.

Within this aim, an object of the present invention is to provide a bicycle chain cleaner that is simple, relatively easy to provide in practice, safe in use, effective in operation, and has a relatively low cost.

This aim and this and other objects that will become better apparent hereinafter are achieved by the present bicycle chain cleaner fitted on a spray can of cleaning and lubricating solution, characterized in that it comprises: a lower half-shell and an upper half-shell, which are provided centrally with a flat and elongated tray, respectively for collection and for covering a region where a sprayed solution is dispensed, said half-shells being provided, the former in an upper region and the latter in a lower region, with an inlet and an outlet for a chain, which are aligned and co-planar; articulation means, which are interposed between said half-shells; means for coupling one of said half-shells to the top of a spray can; and a trigger that is associated with the other one of said half-shells in order to make edges of said half-shells mate, leaving the thumb of a user free to operate the spray button of the can, respective brushes with tufts of radial bristles being fitted in said half-shells so that they can rotate, said tufts being adapted to penetrate, when the chain advances in the half-shells, between links of said chain in order to provide a brushing action and distribute the sprayed solution.

BRIEF DESCRIPTION OF THE DRAWINGS

Further characteristics and advantages of the present invention will become better apparent from the following detailed description of a preferred but not exclusive embodiment of a bicycle chain cleaner fitted on a spray can of cleaning and lubricating solution, according to the invention, illustrated by way of nonlimiting example in the accompanying drawings, wherein:

FIGS. 1 and 2 are side views of a bicycle chain cleaner fitted on a spray can of cleaning and lubricating solution according to the invention, in the inactive configuration and in the active configuration, respectively;

DESCRIPTION OF THE PREFERRED EMBODIMENTS

Figure 3:
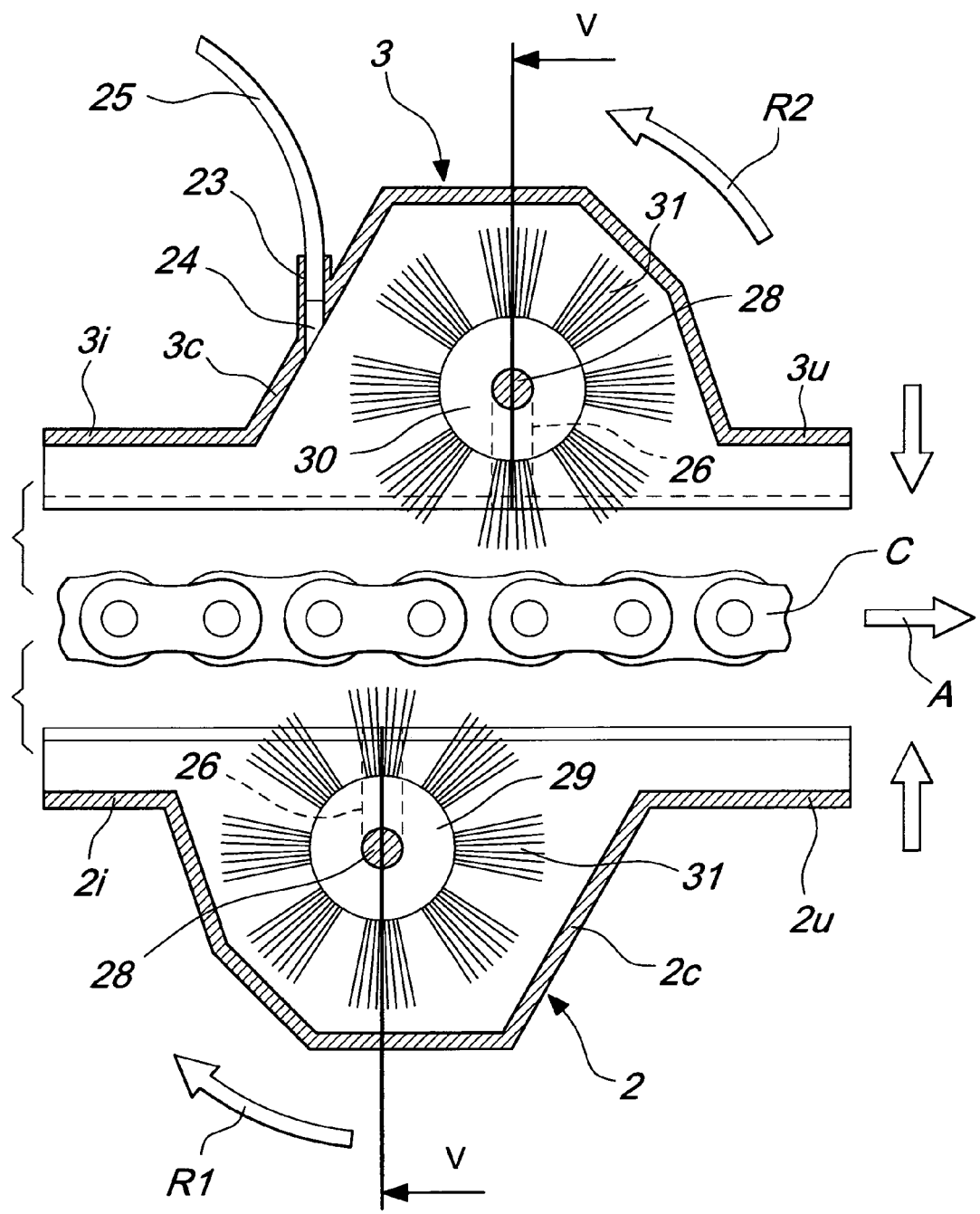
FIG. 3 is a sectional side view, taken along a central plane, with the half-shells in a spaced configuration.
Figure 4:
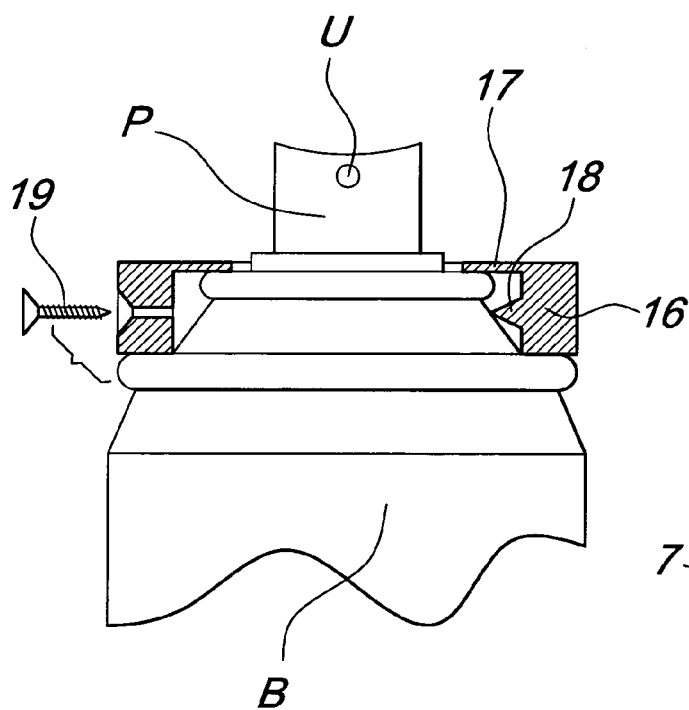
FIG. 4 is a sectional side view, taken along a diametrical plane, of the means for engaging the chain cleaner with the spray can.
Figure 5:
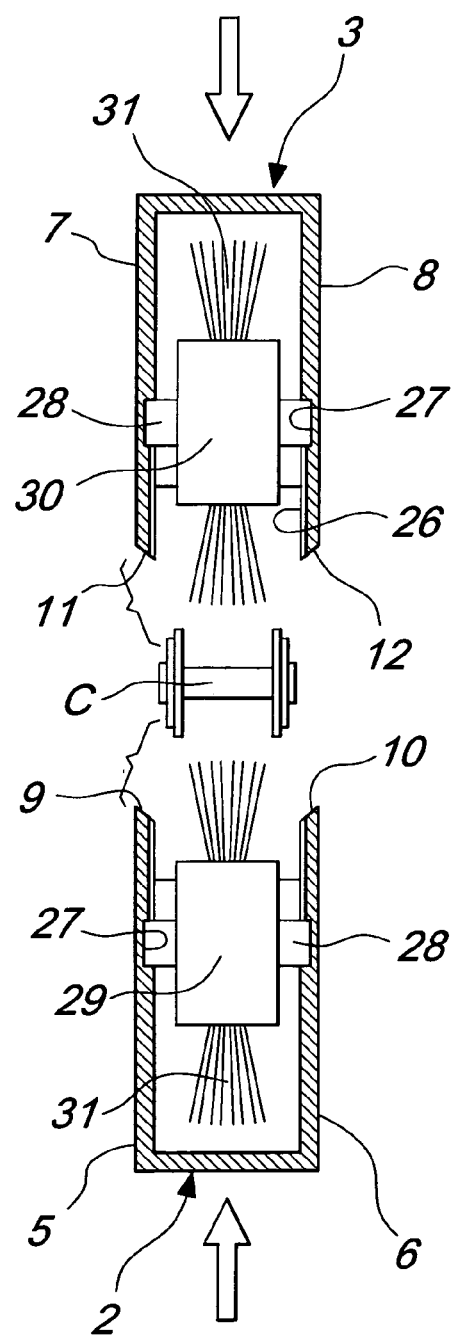
FIG. 5 is a partially sectional front view of the half-shells.

With reference to the figures, the reference numeral 1 generally designates a bicycle chain cleaner fitted on a spray can B of cleaning and lubricating solution: the reference letter C designates a bicycle chain, and the arrow A designates the direction in which the chain is made to advance in the chain cleaner according to the invention.

The chain cleaner 1 comprises a lower half-shell 2 and an upper half-shell 3, which are provided centrally with a flat and elongated tray 2c, 3c, respectively for collection and for covering the region where the sprayed solution is dispensed; said half-shells have, respectively in an upper region and in a lower region, an inlet 2i, 3i and an outlet 2u, 3u for the chain C, which are aligned and co-planar.

The half-shells 2 and 3 are mutually articulated about the axis of a pivot 4, which is parallel to the longitudinal direction of the half-shells.

The sides 5, 6 and 7, 8 of the half-shells 2 and 3, in the active configuration, are mutually parallel, and each one is co-planar to the side of the other half-shell; their mutually opposite inlets 9, 10, 11, 12 are contoured and inclined so as to form an interlocking coupling that forms a seal of one half-shell against the other and causes the sprayed solution to gather toward the inside of the half-shells.

Means for articulating the half-shells 2 and 3 are provided which comprise a first arm 13, which is arranged between the side of the upper edge of the lower half-shell 2 and means for coupling to the top of the can, and a second arm 14, which is arranged between the side of the lower edge of the upper half-shell 3 and a trigger 15; said arms are mutually articulated by the pivot 4.

The means for coupling to the top of the can B are constituted by a ring 16, with an upper inlet that has a reduced diameter 17 and is provided, in a lower region, with at least one radial tooth 18 and with at least one radial screw 19 for engaging below the upper edge of the spray can B.

The first arm 13 and the second arm 14 have, in an upper region, respective hooks 20 and 21 for the ends of a traction spring 22, which is suitable to keep the half-shells 2 and 3 in the configuration in which the inlets are spaced for the lateral insertion of the chain C.

The lower half-shell 2 has a longitudinal plane of symmetry that is parallel to the axis of the spray can B.

A tubular coupling 23 is provided in the upper half-shell 3 at a through hole 24, for the end of a flexible tube 25 for connection to the nozzle U for the exit of the solution from the spray can B.

The half-shells 2 and 3 have, on their sides, respective slots 26, which end inside the half-shell with blind holes 27 for the insertion and rotary support of the ends of hubs 28 of two brushes 29 and 30 with tufts 31 of radial bristles; the tufts of radial bristles are suitable to penetrate, upon the advancement of the chain C in the half-shells 2 and 3, between the links of said chain in order to provide a brushing action and distribute the sprayed solution.

Advantageously, the brushes 29 and 30 with radial bristles are fitted inside the respective half-shells 2 and 3 so that one lies further forward and the other one lies further back, in order to work on two contiguous links of the chain C without interfering with each other.

The operation of the chain cleaner of the invention is as follows. After fixing the chain cleaner by way of the described means for coupling to the top of the spray can B, while gripping the spray can with the thumb on the spraying button P, one approaches the chain C with the chain cleaner in the open configuration shown in FIG. 1. By acting on the trigger 15 in contrast with the spring 22, the inlets of the half-shells 2 and 3 are moved mutually closer so as to provide the longitudinal interlockings of the edges 9, 10, 11 and 12; the thumb is free for the actuation of the spraying button P of the can B.

By making the chain C advance in the direction of the arrow A, the tufts 31 of bristles are pushed between the links of the chain, and the tufts of bristles of the brush 29 dip into the cleaning and lubricating solution that gradually descends into the central region 2c of the lower half-shell 2: as mentioned, the brushes 29 and 30 are arranged so that one lies in front of the other, so as to operate better and not interfere with each other in penetrating between the links: the rotating brushes 29 and 30 rotate respectively in the directions of the arrows R1 and R2.

It has thus been shown that the invention has achieved the intended aim and object, and in particular that it can be used with just one hand, while the other hand can act on the pedal to produce the advancement of the chain C, and that the bristles of the circular brushes can operate in the optimum manner without interfering with each other, dipping automatically where the cleaning and lubricating solution is deposited and spreading it in all the regions of the chain.

The invention thus conceived is susceptible of numerous modifications and variations, all of which are within the scope of the appended claims.

All the details may further be replaced with other technically equivalent ones.

In the illustrated embodiments, individual characteristics, given in relation to specific examples, may actually be interchanged with other different characteristics that exist in other embodiments.

Moreover, it is noted that anything found to be already known during the patenting process is understood not to be claimed and to be the subject of a disclaimer.

In practice, the materials used, as well as the shapes and dimensions, may be any according to requirements without thereby abandoning the protective scope of the appended claims.

The disclosures in Italian Patent Application No. BO2003A000483 from which this application claims priority are incorporated herein by reference.

What is claimed is:

1. A bicycle chain cleaner fitted on a spray can of cleaning and lubricating solution, comprising: a lower half-shell and an upper half-shell, which are provided centrally with a flat and elongated tray, respectively for collection and for covering a region where a sprayed solution is dispensed, said half-shells being provided, the former in an upper region and the latter in a lower region, with an inlet and an outlet for a chain, which are aligned and co-planar; articulation means, which are interposed between said half-shells; means for coupling one of said half-shells to the top of a spray can; and a trigger that is associated with the other one of said half-shells in order to make edges of said half-shells mate, leaving the thumb of a user free to operate the spray button of the can, respective brushes with tufts of radial bristles being fitted in said half-shells so that they can rotate, said tufts being adapted to penetrate, when the chain advances in the half-shells, between links of said chain in order to provide a brushing action and distribute the sprayed solution.

2. The chain cleaner of claim 1, wherein said half-shells are mutually articulated about an axis that is parallel to a longitudinal direction of the half-shells.

3. The chain cleaner of claim 1, wherein the inlets of sides of said half-shells are contoured and inclined so as to form an interlocking coupling that makes the sprayed solution gather inside the half-shells.

4. The chain cleaner of claim 3, wherein said articulation means comprise a first arm, which is arranged between the side of the upper edge of the lower half-shell and said means for coupling to the top of said can, and a second arm, which is arranged between the side of the lower edge of the upper half-shell and said trigger, said arms being mutually articulated by a pivot.

5. The chain cleaner of claim 1, wherein said means for coupling to the top of said can are constituted by a ring with an upper inlet having a reduced diameter, which is provided in a lower region with teeth and at least one radial screw for engaging below the upper edge of the can.

6. The chain cleaner of claim 4, wherein said first and second arms are provided, in an upper region, with respective hooks for ends of a traction spring adapted to keep said half-shells in a configuration in which the inlets are spaced apart for lateral insertion of said chain.

7. The chain cleaner of claim 1, wherein said lower half-shell has a longitudinal plane of symmetry that is parallel to a longitudinal axis of the can.

8. The chain cleaner of claim 1, wherein in the upper half-shell there is a coupling for an end of a flexible tube for connection to an outlet for exit of the solution from the can.

9. The chain cleaner of claim 1, wherein said half-shells have, on their sides, respective slots that end inside the half-shell with blind holes for insertion and rotary support of ends of hubs of said brushes with tufts of radial bristles.

10. The chain cleaner of claim 1, wherein said brushes with radial bristles are fitted in the respective half-shells so that one lies ahead of another.

* * * * *